United States Patent
Legrand et al.

(10) Patent No.: US 10,417,821 B2
(45) Date of Patent: Sep. 17, 2019

(54) METHOD OF SIMPLIFYING A GEOMETRY MODEL

(71) Applicant: INSTITUT MINES TELECOM, Paris (FR)

(72) Inventors: Helene Legrand, Paris (FR); Tamy Boubekeur, Paris (FR)

(73) Assignee: INSTITUT MINES TELECOM, Paris (FR)

( * ) Notice: Subject to any disclaimer, the term of this patent is extended or adjusted under 35 U.S.C. 154(b) by 19 days.

(21) Appl. No.: 15/571,597

(22) PCT Filed: May 2, 2016

(86) PCT No.: PCT/FR2016/051030
§ 371 (c)(1),
(2) Date: Nov. 3, 2017

(87) PCT Pub. No.: WO2016/177959
PCT Pub. Date: Nov. 10, 2016

(65) Prior Publication Data
US 2018/0144545 A1 May 24, 2018

(30) Foreign Application Priority Data
May 7, 2015 (FR) ..................................... 15 54109

(51) Int. Cl.
*G06T 17/00* (2006.01)
*G06T 17/20* (2006.01)
(52) U.S. Cl.
CPC .......... *G06T 17/205* (2013.01); *G06T 17/005* (2013.01)
(58) Field of Classification Search
None
See application file for complete search history.

(56) References Cited

U.S. PATENT DOCUMENTS

| | | | |
|---|---|---|---|
| 5,929,860 A | 7/1999 | Hoppe | |
| 6,198,486 B1 * | 3/2001 | Junkins | G06T 17/20 345/419 |

(Continued)

FOREIGN PATENT DOCUMENTS

| | | |
|---|---|---|
| CN | 101650838 A | 2/2010 |
| CN | 101853485 A | 10/2010 |

(Continued)

OTHER PUBLICATIONS

Gobbetti et al. ("Far Voxels: A Multiresolution Framework for Interactive Rendering of Huge Complex 3D Models on Commodity Graphics Platforms") Visual Computing Group, POLARIS Edificio 09010 Pula, Italy 2005 ACM (Year: 2005).*

(Continued)

*Primary Examiner* — Yanna Wu
(74) *Attorney, Agent, or Firm* — Frost Brown Todd LLC

(57) ABSTRACT

The present invention relates to a method of simplifying a geometry model, the method comprises: determination (607) of an integral error rating $Q_i^S$ defined as being a function of a sum of the error measures associated with the points of the plurality having a lower associated Morton code than the Morton code associated with the current point; determination (614) if a given set of points of the plurality can be simplified by a new point, the points of the given set all being the points of the plurality having a Morton code associated with one and the same prefix of given length, as a function of at least of a difference between: —the integral error measure $Q_{las}^S$ determined for the point of the given set having the largest Morton code (las); and—the integral error measure $Q_{ini-1}^S$ determined for the point of the plurality having an immediately lower Morton code (ini−1) than the smallest Morton code out of the Morton codes associated with the points of the set.

12 Claims, 10 Drawing Sheets

(56) References Cited

U.S. PATENT DOCUMENTS

| | | |
|---|---|---|
| 6,771,261 B2 | 8/2004 | MacPherson |
| 7,876,322 B2 | 1/2011 | Xie et al. |
| 8,525,848 B2 | 9/2013 | Janson |
| 8,760,450 B2 | 6/2014 | DeCoro et al. |
| 8,780,112 B2 * | 7/2014 | Kontkanen ............... G06T 1/60 345/426 |
| 9,373,192 B2 | 6/2016 | Wei |
| 2003/0112239 A1 | 6/2003 | Shin et al. |

FOREIGN PATENT DOCUMENTS

| | | |
|---|---|---|
| CN | 101853525 | 10/2010 |
| CN | 102509339 | 6/2012 |
| CN | 103136535 A | 6/2013 |
| CN | 103268634 A | 8/2013 |
| CN | 103530899 A | 1/2014 |
| CN | 103996221 A | 8/2014 |
| EP | 1 793 348 | 6/2007 |
| EP | 2 533 213 A2 | 12/2012 |
| EP | 2 817 783 A1 | 12/2014 |
| GB | 2333019 A | 7/1999 |
| GB | 2336979 A | 11/1999 |
| KR | 10-0810294 B1 | 3/2008 |
| KR | 20130084053 A | 7/2013 |
| TW | I 280515 B | 5/2007 |
| WO | WO 2012/129484 A1 | 9/2012 |
| WO | WO 2013/123636 A1 | 8/2013 |
| WO | WO 2016/177959 A1 | 11/2016 |

OTHER PUBLICATIONS

Cohen-Streiner, D., et al., "Variational shape approximation," ACM Transactions on Graphics (TOG), Aug. 2004, v. 23, n.3, 10 pgs.

Decoro, C., et al., "Real-time mesh simplification using the GPU", Proceedings of the 2007 Symposium on Interaction 3D Graphics and Games, Seattle, WA, Apr. 10-May 2, 2007, pp. 161-166.

Garland, M., et al., "Surface simplification using quadric error metrics", Proceedings of the $24^{th}$ Annual Conference on Computer Graphics and Interactive Techniques, 1997, pp. 209-216.

Haselhoff, A., et al., "On filtering by means of generalized integral images: a review and applications", Multidim Syst Sign Process, 2012, 23(1-2):291-312, XP019997254, 22 pgs.

Hoppe, H., et al., "Mesh optimization", Proceedings of the $20^{th}$ Annual Conference on Computer Graphics and Interactive Techniques, Anaheim, CA, Aug. 2-6, 1993, pp. 19-26.

Lindstrom, P., et al., "Out-of-core simplification of large polygonal models," Proceedings for the $27^{th}$ Annual Conference on Computer Graphics and Interactive Techniques, 2000, pp. 259-262.

Shaffer, E., et al., "Efficient Adaptive Simplification of Massive Meshes", Visualization, 2001, IEEE Proceeedings, VIS '01, Jan. 1, 2001, XP031172879, 8 pgs.

International Search Report and Written Opinion dated Sep. 15, 2016 for Application No. PCT/FR2016/051030, 15 pgs.

* cited by examiner

. . .

METHOD OF SIMPLIFYING A GEOMETRY MODEL

This application is a US national entry application of PCT/FR2016/051030, entitled, "METHOD OF SIMPLIFYING A GEOMETRY MODEL," filed May 2, 2016, the disclosure of which is incorporated by reference herein which claims priority to 15 54109 (FR), filed May 7, 2015, the disclosure of which is incorporated by reference herein.

The present invention relates to the field of object modeling and in particular the field of simplification of geometry models (mesh or point cloud, for example) for objects modeled in three dimensions.

When modeling objects in three dimensions based on real objects, the point models obtained or the mesh models (for example triangular faces) may be present in very large numbers (for example several million faces/triangles) in order to represent the geometry of the object in intricate detail.

Three-dimensional modeling (3D) of these real objects can in particular be carried out with the aid of techniques using 3D scanners. A 3D scanner is a device that analyzes objects or their surroundings in order collect precise information about their shape and possibly their appearance (color, texture . . . ). These three-dimensional scanners may use various technologies such as light (for example laser, structured light, modulated light), ultrasound, or X-rays. An example of a 3D scanner intended for the general public is the Google Tango tablet or the Microsoft Kinect product. Any photo sensor is a potential 3D scanner, only requiring the addition of a stereovision program which reconstructs a 3D shape from a series of photos.

Whether digitized or created virtually, digital 3D objects can be of different types and uses, including:
  urban and architectural data (for example buildings),
  cultural data (scans of archaeological sites, scans of artwork)
  big data from simulation,
  data extracted from medical images,
  data captured for visual media such as previewing special effects,
  creating content for video games,
  etc.

However, the 3D models resulting from these modeling tools are often very complex and therefore very cumbersome. It can be complicated to manipulate/view these models on computer equipment of low computing power (such as a smartphone). In addition, limited network capacity (such as poor quality WiFi networks, mobile networks) can prevent instant and convenient downloading of these cumbersome models.

To adapt these models to such constrained contexts, existing methods of geometric simplification are based primarily on two broad categories of techniques:
  iterative simplification algorithms: grouping of mesh vertices or contraction of edges (Hoppe et al *"Mesh optimization"* 1993, or Garland et al. *"Surface simplification using quadric error metrics"* 1997);
  partitioning algorithms: partitioning meshes into regions (for example Lindstrom et al. *"Out-of-core simplification of large polygonal models"* 2000, or Cohen-Streiner et al. *"Variational shape approximation"* 2004).

These algorithms are relatively slow and can consume a large amount of memory. Their application to large models can therefore be difficult. In addition, for some partitioning algorithms, convergence of the algorithms may not be guaranteed.

There is therefore a need to simplify, effectively and realistically, the large and complex models that can be produced by 3D modeling tools.

In addition, there is also a need to perform this simplification very rapidly in order to be able to simplify the models in near real-time (for example, fast response is needed in cases of a request for simplification, transmission of a model during movement).

Of course, although this simplification must be fast, it must also avoid degrading the quality of the simplified models as much as possible, so that the original shape is best preserved.

The present invention improves the situation.

To this end, the present invention provides a method of simplifying a geometry model that is effective and optimized for parallel calculations.

The present invention therefore relates to a method of simplifying a geometry model, the method comprising:
  /a/ reception of said geometry model comprising a plurality of points, each point of the plurality being associated with an error rating;
  /b/ for each current point of said geometry model,
    determination of a Morton code associated with the current point, as a function of the coordinates of said current point;
    determination of an integral error rating defined as being a function of a sum of the error ratings associated with the points of the plurality having a lower associated Morton code than the Morton code associated with the current point;
  /c/ determination of whether a given set of points of the plurality can be simplified by a new and single point, the points of the given set all being the points of the plurality having an associated Morton code with a same prefix of given length, as a function of at least a difference between:
    the integral error rating determined for the point of the given set having the greatest Morton code; and
    the integral error rating determined for the point of the plurality having an immediately lower Morton code than the smallest Morton code among the Morton codes associated with the points of the set.

A "geometry model" may for example be a mesh or a point cloud. For simplicity, the term "mesh" is used below rather than "geometry model."

Most often, the "error ratings" are represented using a function, a matrix (for example 4×4) representing a quadric. From a given error rating, it is possible to calculate an error value ($\in$).

Of course, the terms "lower", "greatest", "smallest" are to be interpreted according to a given order relation (in the mathematical sense). Therefore, the term "lower" or "less than" within the meaning of this order relation may very well mean "higher" or "greater than" in the "natural" order relation (i.e. the one to which we are accustomed, for example 1<2). Thus, the given order relation may be the "natural" order relation (i.e. 001100<110101) or may be the reverse of this "natural" order relation (i.e. 001100>110101).

As will be explained below, it is possible to perform the determination of step /c/ by identifying the parent node that is common to the set of points in a k-d tree.

In addition, the error rating associated with a current point of the plurality can be a function of a quadric representative of faces of the model for which at least one of the vertices is said current point or is at a distance less than a predetermined distance from said current point.

The predetermined distance may be chosen as less than a face size (for example 30% of the smallest dimension among the faces of the model or among nearby faces in the model).

In one particular embodiment, the error rating associated with a current point of the plurality may be a function of the color of the faces of the model for which at least one of the vertices is said current point.

This consideration of color in determining the error rating can prevent excessive simplifications in areas of the mesh having significant color changes.

Additionally or alternatively, the error rating associated with a current point of the plurality may be a function of a quadric representative of a normal vector associated with said current point.

This consideration of normal vectors in determining the error rating can prevent excessive simplifications in areas of the mesh having significant geometric patterns of small amplitudes (for example a region containing hair, or a region containing fiber structures, etc.).

In addition, the method may comprise:
if a first point of the plurality is associated with a Morton code identical to a second point of the plurality, deletion of said second point from the plurality of points.

It is thus possible to deduplicate very similar points in the mesh. Indeed, the associated Morton code may have a lower precision than the precision of the spatial coordinates (i.e. the number of bits used for the Morton code is less than three times the number of bits used for each of the coordinates). Consequently, two different points of the model may have the same Morton code.

In one embodiment, said new point may be a function of the points of the set. For example, this new point may be a centroid (possibly weighted) of the points of this set.

Additionally or alternatively, said new point may be determined by a minimization of a value that is a function of said difference. For example, if the difference is a quadric Q and if the new point is denoted p, it is possible to minimize $(p,1)^T Q(p,1)$. This minimization may be iterative (i.e. modifying the value of p many times to move towards a minimum value), formal (i.e. solving a minimization equation), or even semi-formal (solving an equation giving a result close to minimization).

The method may further comprise:
determination of a k-d tree on the basis of a Morton coding, said tree having said plurality of points as leaves.

The determination of such a tree simplifies the computer implementation of the method described above and facilitates an implementation with parallel processing. The method can then be described by paths in the tree, paths which can be optimized to support static memory allocations (for example only storing the initial (ini) and final (las) leaf nodes to be grouped rather than the list of nodes to be grouped, etc.).

Thus, as said k-d tree has internal nodes, each internal node can be associated with a point. The determination in step /c/ can also be a function of said point and of a transpose of said point.

In one embodiment, the integral error rating for each current point may be calculated as a function of a sum of:
the integral error rating of a point having an immediately lower Morton code than the Morton code of the current point;
the error rating of said current point.

Thus, the number of operations necessary for the calculation of each integral error rating is limited to a single mathematical operation.

If no point having an immediately lower Morton code than the Morton code of the current point exists (i.e. the current point has the smallest Morton code), then the integral error rating is simply the error rating of said current point. This amounts to considering that "the integral error rating of a point having an immediately lower Morton code than the Morton code of the current point" is equal to the zero element (denoted "0", but possibly corresponding to a zero quadric/matrix).

The present invention also relates to a device for efficient simplification of a geometry model. The device comprises:
/a/ an interface for receiving said geometry model comprising a plurality of points, each point of the plurality being associated with an error rating;
/b/ a circuit suitable for, for each current point of said geometry model:
determination of a Morton code associated with the current point, as a function of the coordinates of said current point;
determination of an integral error rating defined as being a function of a sum of the error ratings associated with the points of the plurality having a lower associated Morton code than the Morton code associated with the current point;
/c/ a circuit suitable for determination of whether a given set of points of the plurality can be simplified by a new point, the points of the given set all being the points of the plurality having an associated Morton code with a same prefix of given length, as a function of at least a difference between:
the integral error rating determined for the point of the given set having the greatest Morton code; and
the integral error rating determined for the point of the plurality having an immediately lower Morton code than the smallest Morton code among the Morton codes associated with the points of the set.

A computer program implementing all or part of the method described above, installed on existing equipment, is in itself advantageous, since it allows effective simplification of a geometry model.

The present invention therefore also relates to a computer program comprising instructions for implementing the method described above when the program is executed by one or more processors.

This program may use any programming language (for example an object-oriented language or other), and may be in the form of an interpretable source code, partially compiled code, or fully compiled code.

FIGS. 6a, 6b, and 6c, described in detail below, can form the flowchart for the general algorithm of such a computer program.

Other features and advantages of the invention will become apparent upon reading the following description. This is purely illustrative and is to be read with reference to the accompanying drawings in which:

FIG. 1a illustrates an example coding of a coordinate of a point, using Morton coding.

Morton coding is a coding that enables representing a set of coordinates with a single integer.

As an illustration, if a point p is associated with a set of three coordinates (x,y,z) in a space E, it is possible to represent these coordinates by using an integer $p_M$ representative of a Morton code ($p_M$ is called the "Morton code" of p).

It is assumed here that the value of x is expressed in binary form using three bits $x_1$ $x_2$ $x_3$ (where $x_1$ is the value of the first bit of x, $x_2$ the value of the second bit of x, and $x_3$ the value of the third bit of x). Similarly, it is assumed that the value of y is expressed in binary form using three bits $y_1$ $y_2$ $y_3$ (where $y_1$ is the value of the first bit of y, $y_2$ the value of the second bit of y, and $y_3$ the value of the third bit of y). Finally, it is assumed that the value of z is expressed in binary form using three bits $z_1$ $z_2$ $z_3$ (where $z_1$ is the value of the first bit of z, $z_2$ the value of the second bit of z, and $z_3$ the value of the third bit of z).

Therefore the Morton code of the coordinates of p can be calculated (step 100) by successively concatenating the first bit of x, then the first bit of y, the first bit of z. This concatenation is continued by taking the seconds bit of each coordinate, and so on. In the example in FIG. 1a, the value of $p_M$ can be written in binary as: $x_1$ $y_1$ $z_1$ $x_2$ $y_2$ $z_2$ $x_3$ $y_3$ $z_3$.

Thus, if two items have a similar Morton code (particularly the first bits), these points will usually be close within the space E. The reverse is not necessarily true.

Figure 1A:
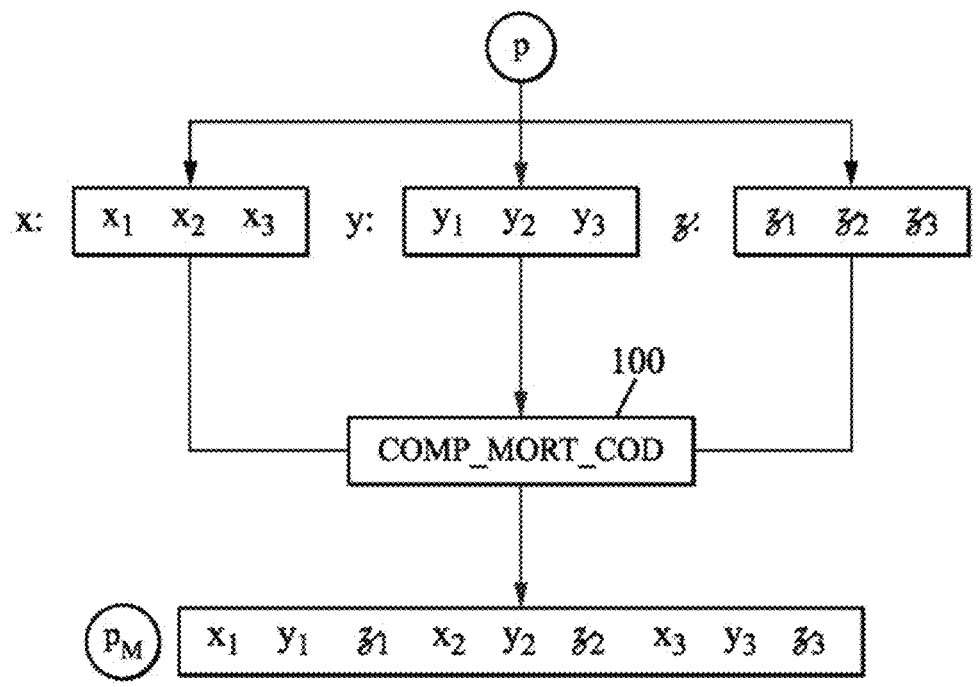
FIG. 1a illustrates an example coding of coordinates of a point, using Morton coding.
Figure 1B:
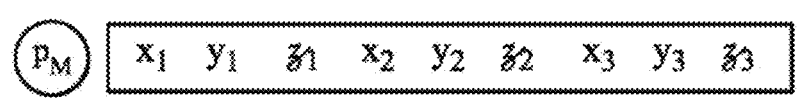
FIG. 1b illustrates an example truncation of a Morton coding.
Figure 1B:
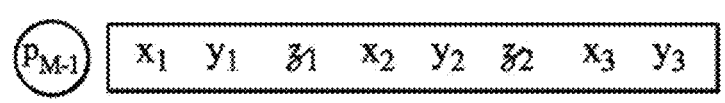
Figure 1B:
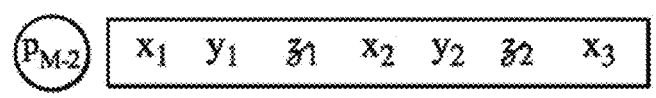

FIG. 1b illustrates an example of truncating a Morton coding.

We use the term "Morton truncated code of order 1" for the value of a Morton code $p_M$ in which the final bit is deleted/ignored. This value is denoted $p_{M-1}$.

We use the term "Morton truncated code of order N" (where N is a natural number) for the value of a Morton code $p_M$ in which the N final bits are deleted/ignored. This value is denoted $p_{M-N}$.

Thus, if the Morton code $p_M$ is $x_1$ $y_1$ $z_1$ $x_2$ $y_2$ $z_2$ $x_3$ $y_3$ $z_3$ in binary, then $p_{M-1}$ is $x_1$ $y_1$ $z_1$ $x_2$ $y_2$ $z_2$ $x_3$ $y_3$ and $p_{M-2}$ is $x_1$ $y_1$ $z_1$ $x_2$ $y_2$ $z_2$ $x_3$.

Figure 2:
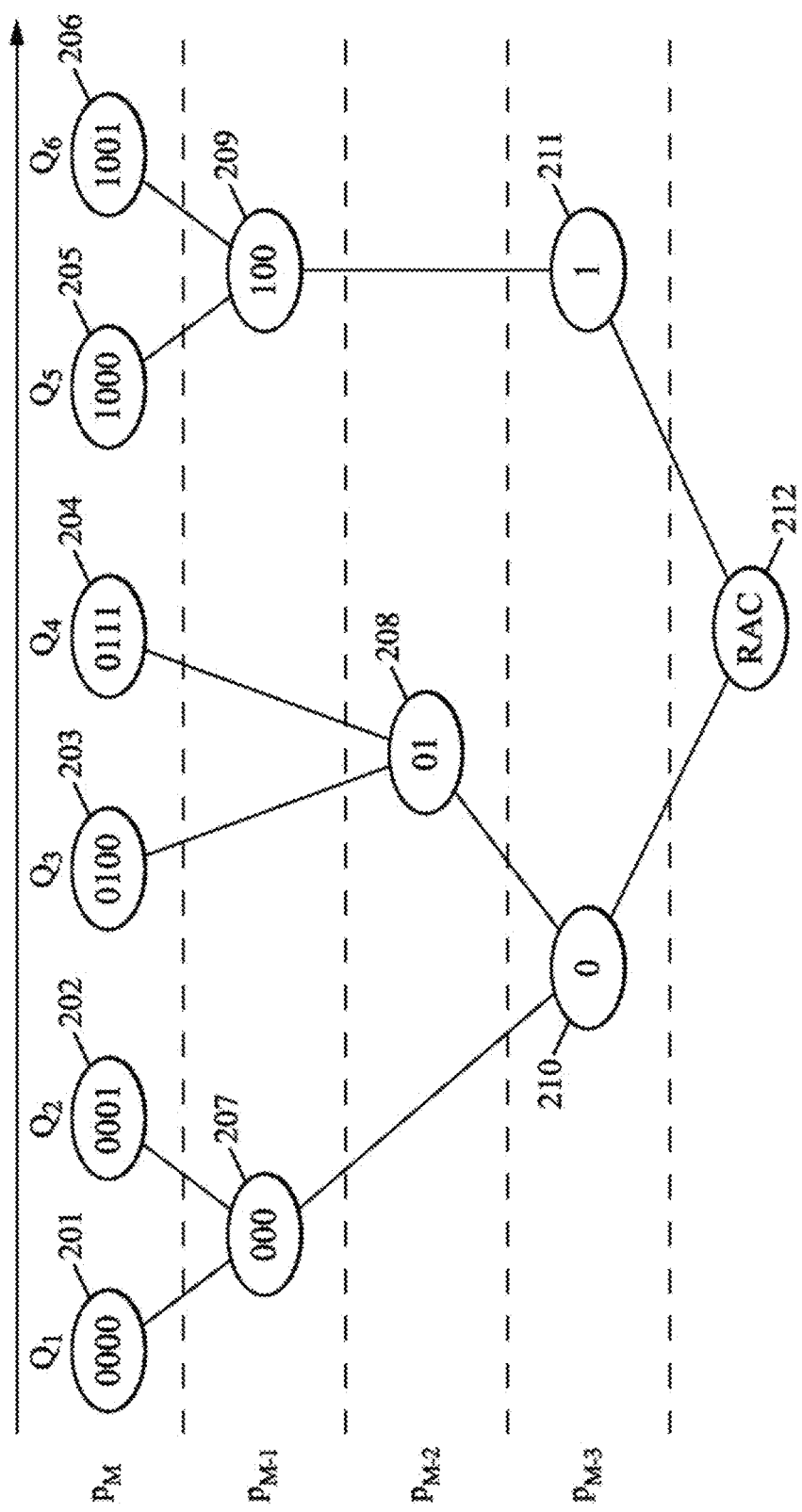
FIG. 2 shows an example k-d tree representing different points of a model using a Morton coding.

FIG. 2 shows an example k-d tree representative of different points of a model using a Morton coding.

A k-d tree (for "k-dimensional tree") is a binary tree in which each node contains a point in dimension k. Each "non-terminal" (or "non-leaf" or "internal") node divides the space into two half-spaces.

In the example of FIG. 2, the "leaf" nodes are nodes 201 to 206. These nodes are each associated with a point of the model in the space E and with a Morton code for this point as described above. For example, point 201 has the Morton code "0000", and node 204 has the Morton code "0111".

To facilitate the process described below, the "leaf" nodes are organized in ascending order from left to right according to their Morton code. It is quite possible to organize these nodes in a different order (for example descending order).

Of course, the precision of the Morton code may be lower than the precision of the coordinates of the model. It is then possible for two "leaf" nodes to be associated with the same Morton code: in this case, one simply needs to traverse the ordered "leaf" nodes and if a duplicate is detected, these two nodes (consecutive since the leaf nodes are ordered) are then combined into a single node.

The terms "parent"/"internal" node refer to a node of the tree that is not a leaf node. All parents are internal nodes. For example, node 209 is the parent node of the two leaf nodes 205 and 206, and node 211 is the parent node of parent node 209.

The term "descendant node of a given node" refers to a node associated with a Morton code having the Morton code of the given node as a prefix. Thus, node 205 is a descendant node of node 209 and again of node 211.

The term "child node of a given node" refers to a descendant node of said given node that is directly connected in the k-d tree. Thus, node 205 is a child node of node 209, but is not a child node of node 211.

The term "descendant leaf node of a given node" refers to a descendant node of the given node where this descendant node is also a "leaf" node. A "leaf" node has no child.

Parent nodes correspond to a truncated Morton code: this Morton code is the longest prefix common to the "descendant" nodes. Thus, "parent" node 207 has two "descendants" 201 and 202 and corresponds to Morton code "000" (i.e. the truncated Morton code of order 1 of the Morton code associated with node 201 or with node 202). Similarly, parent node 208 has two descendants 203 and 204 and corresponds to Morton code "01" (i.e. the truncated Morton code of order 2 of the Morton code associated with node 203 or with node 204, the truncated Morton code of order 1 of the Morton code associated with node 203 and node 204 being different).

The "root" node 212 (RAC) is not associated with any Morton code, but represents the termination of the tree associating the two nodes of the tree that have no parents.

To enable an algorithm to traverse the k-d tree efficiently, it is possible to define, for each node of the tree (excluding "leaf" nodes), the "descendant" nodes (dividing the space into two at most).

In addition, it is possible to define, for each leaf node, i a quadric $Q_i$ for quantifying a geometric error associated with this node i. For "leaf" nodes, this quadric $Q_i$ can be determined on the basis of the algorithm presented by Michael Garland et al. (1997, Surface Simplification Using Quadric Error Metrics, Section 5) and as described in relation to FIGS. 3 and 4. Essentially, this quadric gives, at any point in space, the square of the distance to a plane (for example the plane of a triangle, or the plane defined by a point and its normal).

Figure 3:
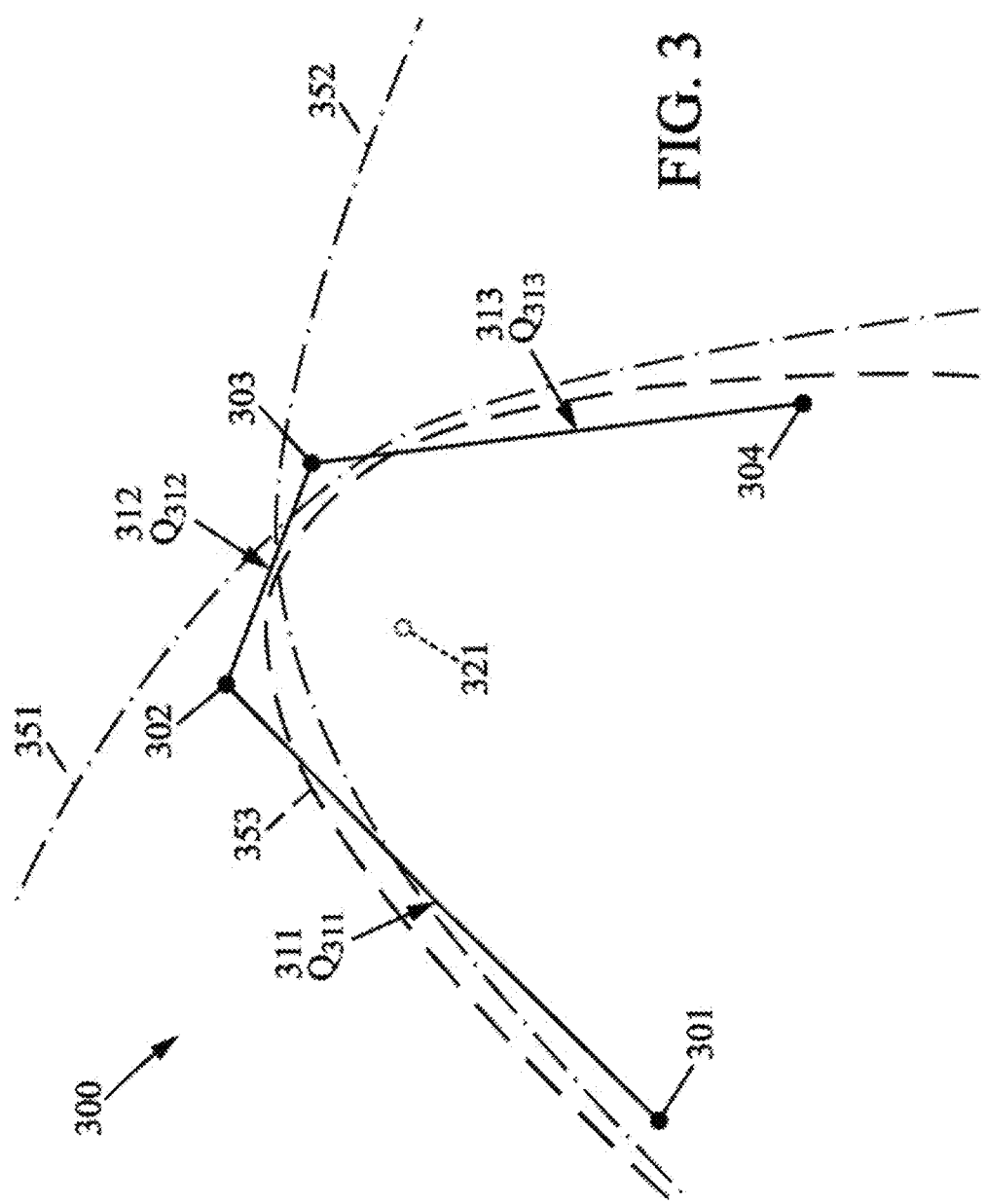
FIG. 3 represents the calculation of quadrics in a 2D model enabling the calculation of geometric errors in this model.

FIG. 3 shows the calculation of quadrics in a 2D model, to enable the calculation of geometric errors in this model.

For each leaf node i, it is possible to determine a quadric $Q_i$ in the form of a symmetric matrix of size 4×4.

For example, to calculate the quadric associated with node 302, one calculates the quadrics of the faces of the mesh having among their vertices the point associated with node 302: in the case of FIG. 3 (a 2D model), the quadric of planar face 311 (i.e. $Q_{311}$) and the quadric of planar face 312 (i.e. $Q_{312}$) are calculated.

If a planar face is described by the equation $ax+by+cz+d=0$ or by the vector $[a, b, c, d]^T$, then the quadric associated with this face is of the form:

$$Q = \begin{bmatrix} a^2 & ab & ac & ad \\ ab & b^2 & bc & bd \\ ac & bc & c^2 & cd \\ ad & cd & cd & d^2 \end{bmatrix}$$

Moreover, for a given point v in the space, the square of the distance from that point to the quadric (or to the plane, if in a planar context) is given by the formula:

$$(v, 1)^T Q(v, 1) = (v, 1)^T \begin{bmatrix} q_{11} & q_{12} & q_{13} & q_{14} \\ q_{12} & q_{22} & q_{32} & q_{24} \\ q_{13} & q_{32} & q_{33} & q_{34} \\ q_{14} & q_{42} & q_{34} & q_{44} \end{bmatrix} (v, 1)$$

(v, 1) is a vector of size 4 comprising the three coordinates of point v followed by the digit 1. This notation allows writing the point v in homogeneous coordinates.

In addition, as the sum of quadrics is a quadric, it is possible to associate with node 302 the quadric $Q_{302}$ defined as the sum of the quadrics of the faces of the mesh having as a vertex at least the point associated with node 302, meaning in this example $Q_{302}=Q_{311}+Q_{312}$. The quadric $Q_{302}$ can be represented by curve 352.

Similarly, it is possible to associate with node 303 the quadric $Q_{303}$ defined as the sum of the quadrics of the faces of the mesh having as a vertex at least the point associated with node 303, meaning in this example $Q_{303}=Q_{312}+Q_{313}$. The quadric $Q_{303}$ can be represented by curve 351.

Assuming that the two points 302 and 303 represent two points of the k-d tree having the same parent, it may be desirable to calculate the quadric associated with this parent (i.e. $Q_{parent}$). It would be possible to calculate this quadric $Q_{parent}$ as the sum of the quadrics of the faces having as a vertex a point associated with a descendant "leaf" node i.e. associated with node 302 or with node 303, i.e.:

$Q_{parent}=Q_{311}+Q_{312}+Q_{313}$ (if each quadric is added only once in the sum), or $Q_{parent}=Q_{311}+2\cdot Q_{312}+Q_{313}$ (if each quadric is added as many times in the sum as the number of vertex "leaf" nodes of the face associated with this quadric).

The quadric $Q_{parent}$ can be represented by curve 353.

Furthermore, for internal nodes (i.e. non-"leaf" nodes), it is possible to associate a point v referred to as "representative". This "representative" point may be, for a given parent node:

a point v of the space minimizing the associated quadric (i.e. minimizing $(v,1)^T Q(v,1)$, where Q is the quadric associated with the parent node). This is possible by solving $$(v, 1) = \begin{bmatrix} q_{11} & q_{12} & q_{13} & q_{14} \\ q_{12} & q_{22} & q_{32} & q_{24} \\ q_{13} & q_{32} & q_{33} & q_{34} \\ 0 & 0 & 0 & 1 \end{bmatrix}^{-1} \begin{bmatrix} 0 \\ 0 \\ 0 \\ 1 \end{bmatrix}$$

if $$\begin{bmatrix} q_{11} & q_{12} & q_{13} & q_{14} \\ q_{12} & q_{22} & q_{32} & q_{24} \\ q_{13} & q_{32} & q_{33} & q_{34} \\ 0 & 0 & 0 & 1 \end{bmatrix}$$

is invertible (the matrix $$Q' = \begin{bmatrix} q_{11} & q_{12} & q_{13} & q_{14} \\ q_{12} & q_{22} & q_{32} & q_{24} \\ q_{13} & q_{32} & q_{33} & q_{34} \\ 0 & 0 & 0 & 1 \end{bmatrix}$$

therefore being a function of the quadric Q, the first three rows being identical);

if the previous matrix is not invertible, a point v of the space satisfying $$(v, 1) = Q_{pseudo} \begin{bmatrix} 0 \\ 0 \\ 0 \\ 1 \end{bmatrix}$$

where $Q_{pseudo}$ is a square 4×4 matrix that is the pseudo-inverse of matrix Q', calculated for example using singular value decomposition or eigenvalue decomposition.

if the matrix Q' is not invertible and/or if an embodiment so provides, a point v of the space chosen as being a function of the points associated with the descendant "leaf" nodes of this given parent node (for example a centroid, possibly weighted, of points 302 and 303). In addition, this point v may also be a function of neighboring points of the points associated with the descendant leaf nodes of that particular parent node (for example a centroid, possibly weighted, of points 302, 303, 301, and 304, point 301 sharing a face with point 302 and point 304 sharing a face with point 304).

To illustrate, the "representative" point associated with the parent node of the two descendant nodes 302 and 303 can be point 321.

However, this heuristic requires, for each parent node of the k-d tree, traversing the tree to the descendant "leaf" nodes of that parent node, identifying the mesh faces having as vertices at least one of these leaf nodes, determining the associated quadrics, calculating n sums (integer n, where n can be large depending on the number of quadrics determined), etc.

This heuristic can therefore be very complex ($2^{n_{bit}}(n_{bit}-1)$ unitary operations, $n_{bit}$ here being the number of bits of the longest Morton code) and highly iterative in the case of a large mesh (i.e. sizable k-d tree).

In addition, to carry out this heuristic it may be useful, for a computer implementation, to dynamically allocate memory blocks for storing each of the quadrics of the descendant leaf nodes before performing the sum. Dynamic memory allocation is not efficient from an algorithmic standpoint in a parallel context. It is not possible to perform static memory allocation here, because the number of quadrics to be considered for calculation of the quadric of the parent node is not known in advance and it is not possible to perform a static allocation of memory corresponding to the largest possible number of descendant leaf nodes as this could fill the memory.

This heuristic is therefore not suitable for efficient parallel calculation. An improved heuristic is presented with reference to FIGS. 5 and 6.

Figure 4:
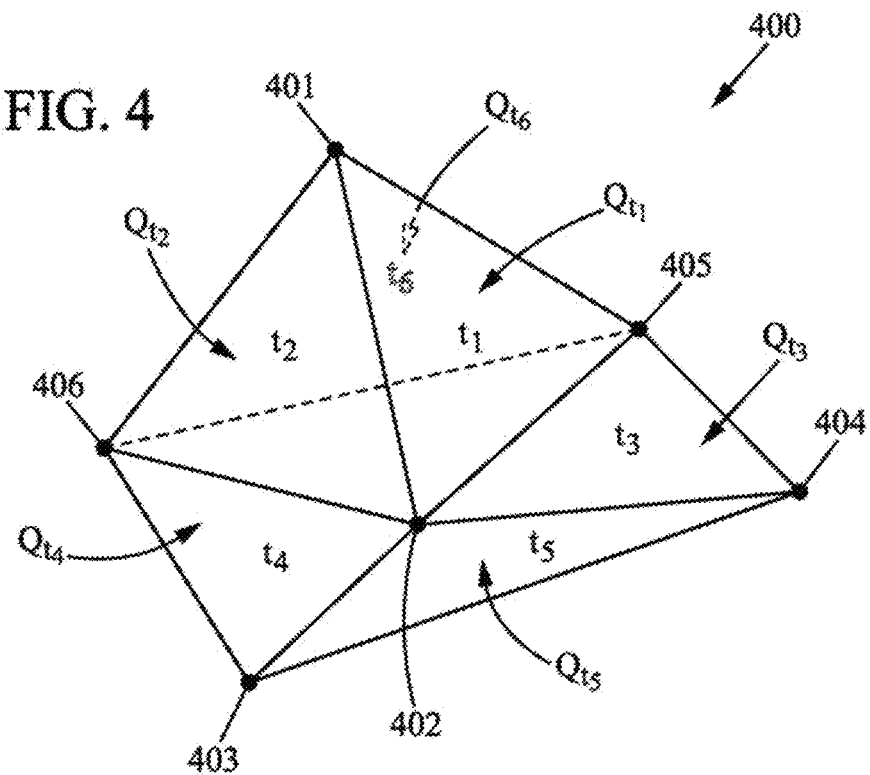
FIG. 4 represents the calculation of quadrics in a 3D model enabling the calculation of geometric errors in this model.

FIG. 4 represents the calculation of quadrics in a 3D model, to enable the calculation of geometric errors in this model.

The description given in relation to FIG. 3 can easily be applied to the case of a 3D mesh 400.

In particular, for a node 401 of the mesh, it is possible to take into account the quadrics associated with adjacent faces of this point 401 (i.e. faces $t_1$, $t_2$, and $t_6$): thus the quadric associated with point 401 can be $Q_{t1}+Q_{t2}+Q_{t6}$. For a node 402 of the mesh, it is possible to take into account the quadrics associated with adjacent faces of this point 402 (i.e. faces $t_1$, $t_2$, $t_3$, $t_4$, and $t_5$): thus the quadric associated with point 402 can be $Q_{t1}+Q_{t2}+Q_{t3}+Q_{t4}+Q_{t5}$.

For the parent node of the two nodes 401 and 402 (assuming these two leaf nodes have the same parent), the associated quadric Q can be $Q_{t1}+Q_{t2}+Q_{t3}+Q_{t4}+Q_{t5}+Q_{t6}$ or else $2Q_{t1}+2Q_{t2}+Q_{t3}+Q_{t4}+Q_{t5}+Q_{t6}$.

Furthermore, the "representative" point of this parent node can be, as before, a point minimizing quadric Q (through inversion or pseudo-inversion of a matrix that is a function of matrix Q) or a point that is a function of points 401 and 402 (or else a function of points 401 to 406).

Figure 5:
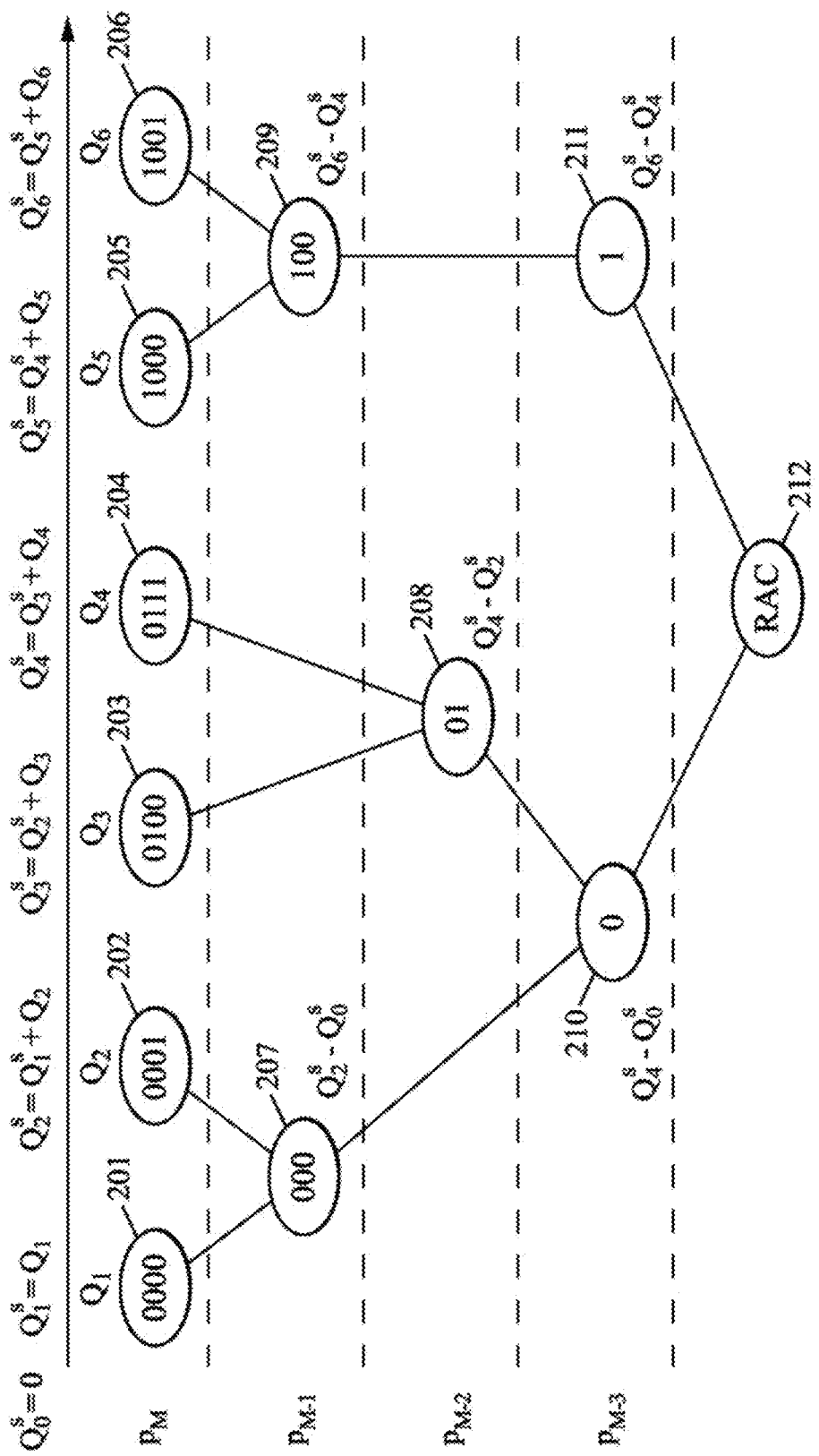
FIG. 5 represents the calculation of integrals of quadrics for the calculation of quadrics for internal nodes of the k-d tree.

FIG. 5 represents the calculation of "integrals" of quadrics for the calculation of quadrics for internal nodes of the k-d tree.

As indicated above, it can be complex and cumbersome to determine the quadrics of internal nodes in the k-d tree.

To simplify the process of calculating these quadrics, once the "leaf" nodes have been sorted according to their Morton code (see FIG. 2, the nodes having an index i reflecting that order), it is possible to follow the following algorithm:
initialize the value of $Q_0^S$ to 0;
for each node i taken in ascending or descending order of the Morton code, calculate the value $Q_i^S$ associated with this node i, $Q_i^S$ being equal to $Q_{i-1}^S+Q_i$ ($Q_i$ being the quadric associated with this node, see FIG. 2).
We refer to $Q_i^S$ as the "integral quadric" associated with node i.

If $Q_{i-1}^S$ is not defined, we can consider its value to be zero.

These integral quadrics enable very simple calculation of any quadric associated with an internal node, merely by knowing its descendant leaf node having the smallest Morton code among the descendant leaf nodes (index $i_{min}$) and of its descendant leaf node having the greatest Morton code among the descendant leaf nodes (index $i_{max}$): in fact, the value of the quadric of this internal node can be calculated as the difference of $Q_{i_{max}}^S$ and $Q_{i_{min}-1}^S$. Thus, the value of the quadric of node 207 is $Q_2^S-Q_0^S$, the value of the quadric of node 208 is $Q_4^S-Q_2^S$, the value of the quadric of node 211 is $Q_6^S-Q_4^S$, the value of the quadric of node 210 is $Q_4^S-Q_0^S$, etc.

This heuristic allows performing only one mathematical operation (i.e. the difference of 4×4 matrices) for each of the internal nodes. Consequently, only $2^{n_{bit}+1}-1$ unitary mathematical operations are needed at most ($n_{bit}$ here being the number of bits of the longest Morton code) to calculate all quadrics of the internal nodes. In addition, for each node, it is only necessary to access two descendant leaf nodes in memory (i.e. the node of index $i_{max}$ and the node of index $i_{min}$). No dynamic memory allocation is therefore required, which increases the efficiency of the algorithm. In addition, calculation of the quadric associated with a node does not require prior calculation of the quadrics associated with all its descendants: only the descendant leaf nodes dependent on this node need to have their quadric initialized (i.e. calculated).

Figure 6A:
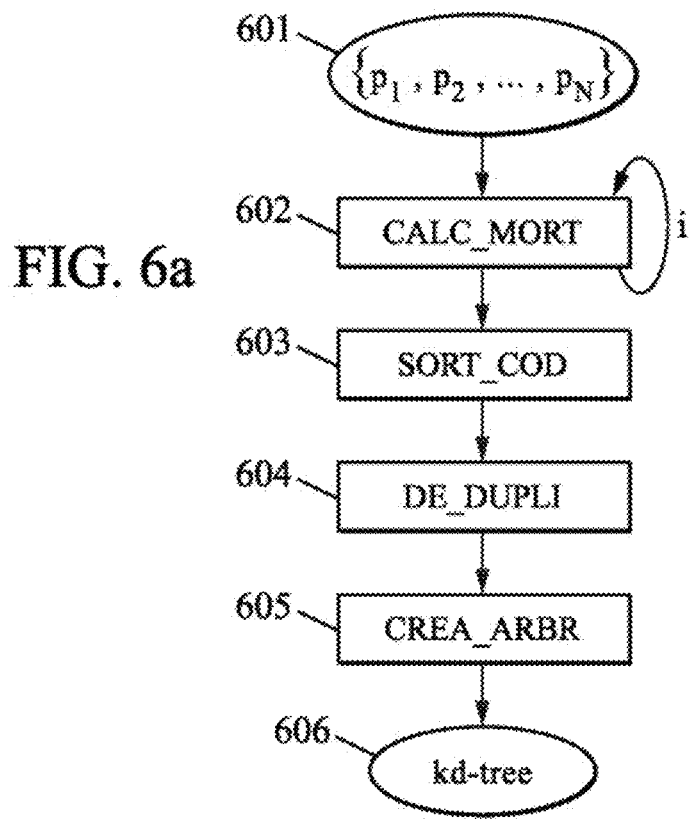
FIG. 6a shows an example flowchart for the creation of the kd tree.

FIG. 6a shows an example flowchart for the creation of the k-d tree.

Upon receipt of N points $\{p_1, p_2, \ldots, p_N\}$ of the mesh (601) describing the model, it is possible to convert the coordinates of these points into Morton code as described in relation to FIG. 1a (step 602).

Once a Morton code is associated with each of these points, it is possible to order these points (or leaf nodes) according to this associated Morton code, as described in relation to FIG. 2 (step 603).

If two leaf nodes have two identical Morton codes (due to the finite resolution used for the Morton code), it is possible to deduplicate these nodes by combining them into one leaf node (step 604).

Next, it is possible to create a k-d tree (606) on the basis of the ordered leaf nodes as described in relation to FIG. 2 (step 605). It is quite possible to replace the k-d tree with an "octree" type of tree (a tree that can have up to 8 children).

Figure 6B:
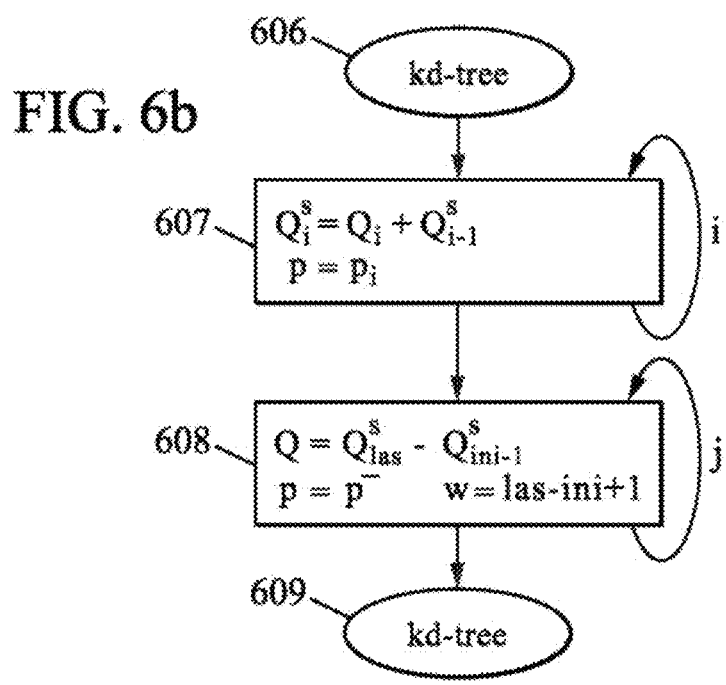
FIG. 6b shows an example flowchart for the calculation of quadrics for internal nodes of the k-d tree.

FIG. 6b shows an example flowchart for the calculation of quadrics for internal nodes of the k-d tree.

Once the k-d tree has been determined, it is possible to associate (step 607) with each leaf node i of the tree (i being an index of the leaf node in the Morton order)
p: the coordinates of the points corresponding to the associated Morton code;
Q: a quadric $Q_i$ calculated as described in relation to FIG. 3 or 4;
$Q^S$: an integral quadric $Q_i^S$ calculated as described in relation to FIG. 5 (i.e. $Q_i^S=Q_i+Q_{i-1}^S$).

For reasons of algorithmic efficiency, it is possible to store the values of the integral quadratic in a table for which each value of $Q_i^S$ is accessible via the index i. Indeed, the values of the integral quadratic can be accessed on a regular basis (see below).

In addition, it is possible to associate (step 608) with each internal node j of the tree 606:
ini: an index of a descendant leaf node having the smallest index. This value can simply be calculated as the minimum value among the ini values of the children nodes of the current internal node if these children nodes are also internal nodes;
las: an index of a descendant leaf node having the greatest index. This value can simply be calculated as the maximum value among the las values of the children nodes of the current internal node if these children nodes are internal nodes;
Q: a quadric $Q_j$ calculated as a function of the difference: between the integral quadric $Q_{ini-1}^S$, and the integral quadric $Q_{las}^S$;
p̂: the coordinates of a point minimizing said quadric $Q_j$ (if the calculation is possible);
w: the number of descendant leaf nodes that are dependent on the current internal node. We also call this number the "weight." This value can simply be calculated as the sum of the values w of the children nodes of the current internal node if these children nodes are also internal nodes, or as las−ini+1;
p̄: the coordinates of an "average" point representing a centroid of the points p of descendant leaf nodes dependent on this internal node. It is possible to calculate this average point efficiently by calculating a centroid of the "average" points p̂ weighted by numbers w for the children nodes of the current internal node (for example with reference to FIG. 5, $$\acute{p}_{210} = \frac{w_{207}}{w_{207}+w_{208}}\acute{p}_{207} + \frac{w_{208}}{w_{207}+w_{208}}\acute{p}_{208}).$$

If the children nodes of the current internal node are leaf nodes, their number w can be considered to be 1 and their associated average point can be considered to be point p (for example in reference to FIG. 5, $\acute{p}_{208} = \frac{1}{2}p_{203} + \frac{1}{2}p_{204}$).

The nodes of the k-d tree 609 are thus enriched with additional information

Figure 6C:
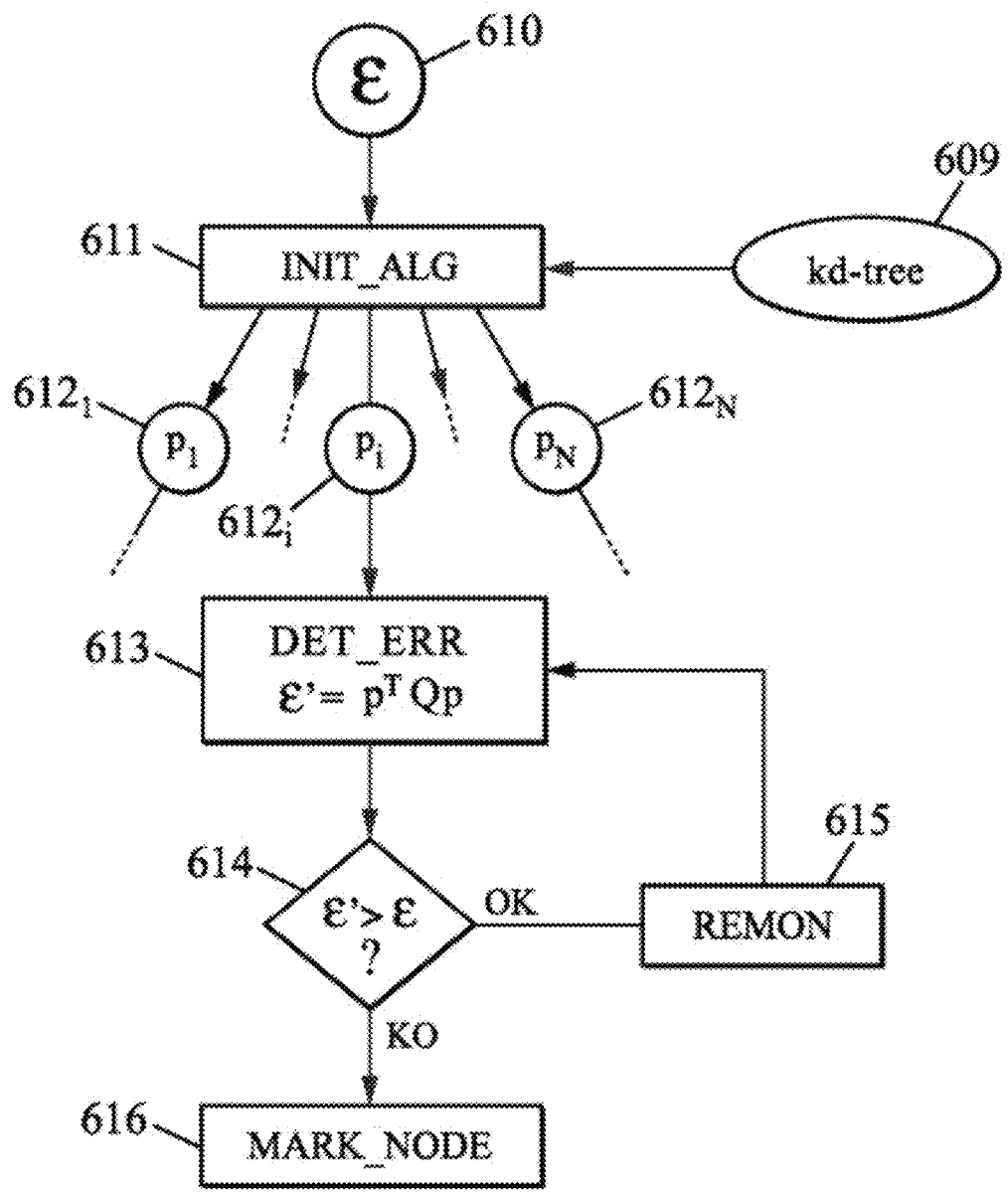
FIG. 6c is an example flowchart for the identification of the nodes to be kept for the simplified model.

FIG. 6c is an example flowchart for the identification of nodes to be kept for the simplified model.

If an error value ∈ (610) is indicated, it is possible to initialize (step 611) the algorithm for the identification of nodes to be kept for the simplified model.

To do this, it is possible to launch N calculation processes in parallel (N being the number of leaf nodes of the k-d tree), each parallel calculation process i being associated with a leaf node $p_i$ ($612_1, \ldots 612_i, \ldots, 612_N$).

These parallel calculation processes will traverse the tree from the root node (RAC) to the associated node $\{p_i\}$ unless "terminated" before reaching that node (see below). For example, if a process is associated with node 202 of FIG. 2, this process will traverse nodes 212, 210, 207, and 202. If a process is associated with node 204 of FIG. 2, this process will traverse nodes 212, 210, 208, and 204.

Of course, in this embodiment, some processes will traverse the same nodes, but it has been found that trying to limit such multiple visits can be disadvantageous to the algorithmic efficiency of the overall process in many situations.

For each parallel calculation process, the process is positioned at the root node of the k-d tree 609 (recall that this node is not associated with a Morton code), then travels up one node towards the leaf node associated with the process. The node where the process is positioned is called the "current node of the process."

For the current node of the process, an error value ∈' is determined (step 613). This error value ∈' is calculated as ∈'=(p̂, 1)Q(p̂, 1)$^T$ if a point p̂ is defined for this node (see description below in relation to FIG. 6b) or as ∈'=(ṕ, 1)Q(ṕ, 1)$^T$ if the point p̂ is not defined for this node (for example the resolution enabling calculation of p̂ is not possible) or if an embodiment so provides. Of course, the calculation of ∈' may have been carried out earlier during the process described in relation to FIG. 6b.

If the determined error value ∈' is greater than the indicated error value ∈ (test 614, OK outcome), this means that point p̂ or ṕ is not acceptable for simplification of the mesh: therefore the process advances a node toward the leaf node associated with the process (step 615).

Otherwise (test 614, KO outcome), the node is selected/marked as acceptable for simplification of the mesh and the process is "ended" (step 616).

If the process reaches a leaf node, it is not necessary to calculate ∈' because, under this assumption, this leaf node is then selected/marked as acceptable for simplification of the mesh.

Figure 7:
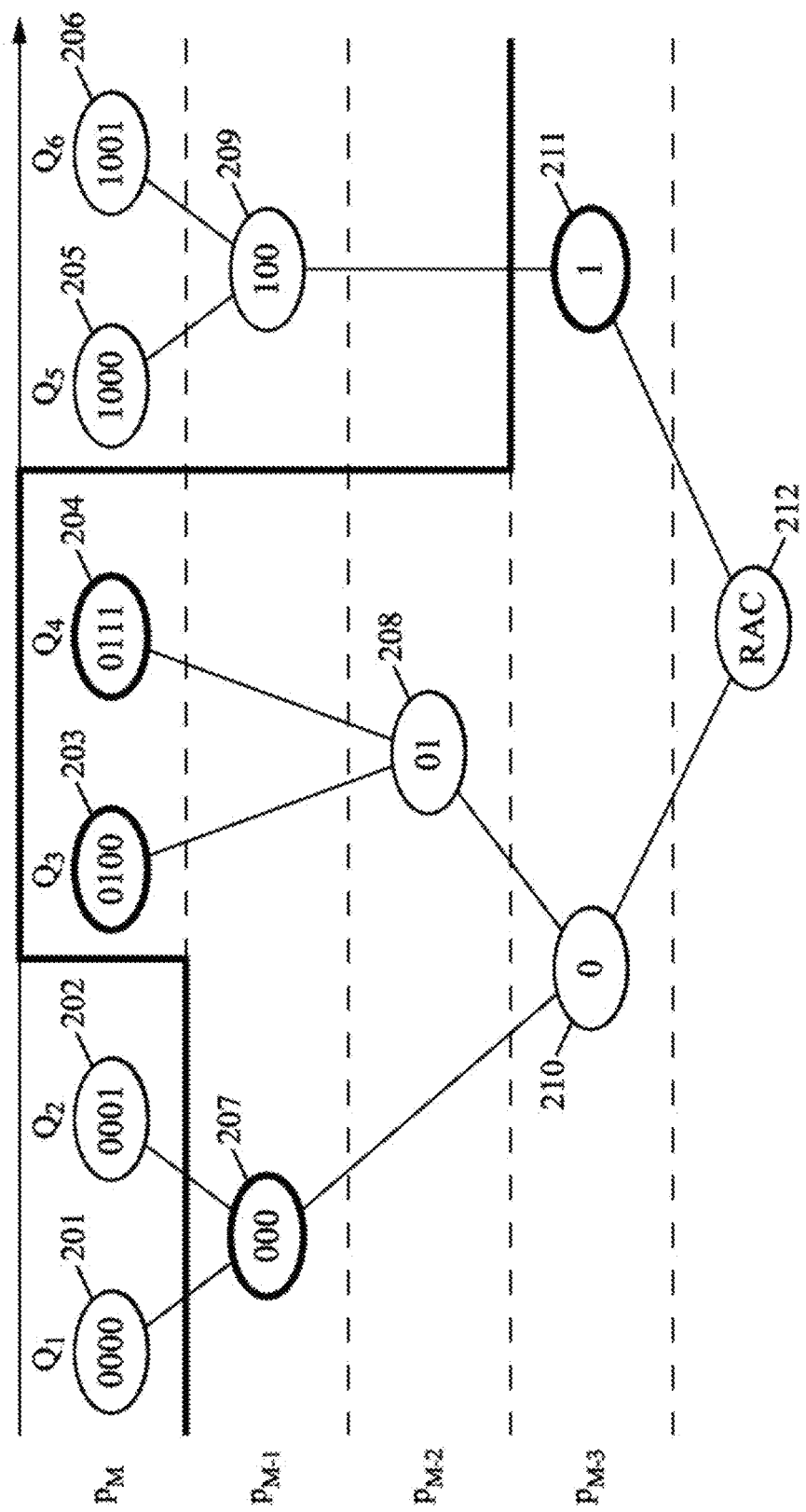
FIG. 7 is an example k-d tree in which some nodes have been selected for keeping in the simplified model.

FIG. 7 is an example k-d tree in which some nodes have been selected for keeping in the simplified model.

In this example, and after execution of the process described in FIG. 6, nodes 207, 203, 204, and 211 have been selected/marked as acceptable for simplification of the mesh.

If a face of the initial model was described by the points (p) associated with nodes 202, 203, and 204, the new mesh is then described by the points (p̂ or ṕ or p) associated with nodes 207, 203, and 204. In general, the new face is described by the selected parent nodes that have at least one descendant leaf node describing the initial face.

If a face of the initial model was described by the points (p) associated with nodes 201, 202, and 203, the face is said to be degenerate: as it is now only described by two points (i.e. associated with nodes 207 and 203), this face is removed from the model. This can happen when two (or more) leaf nodes describing the same face are descendant leaf nodes of a same selected/marked parent node.

Sometimes it also happens that some faces are "turned around" during simplification. It is possible to check for this by comparing the average of the normal vectors of the initial faces (i.e. those which will be replaced) to the normal vector of the new face: if the direction of the normal vector changes significantly, it is possible to "turn around" the final face in order to ensure consistency of the model.

Figure 8A:
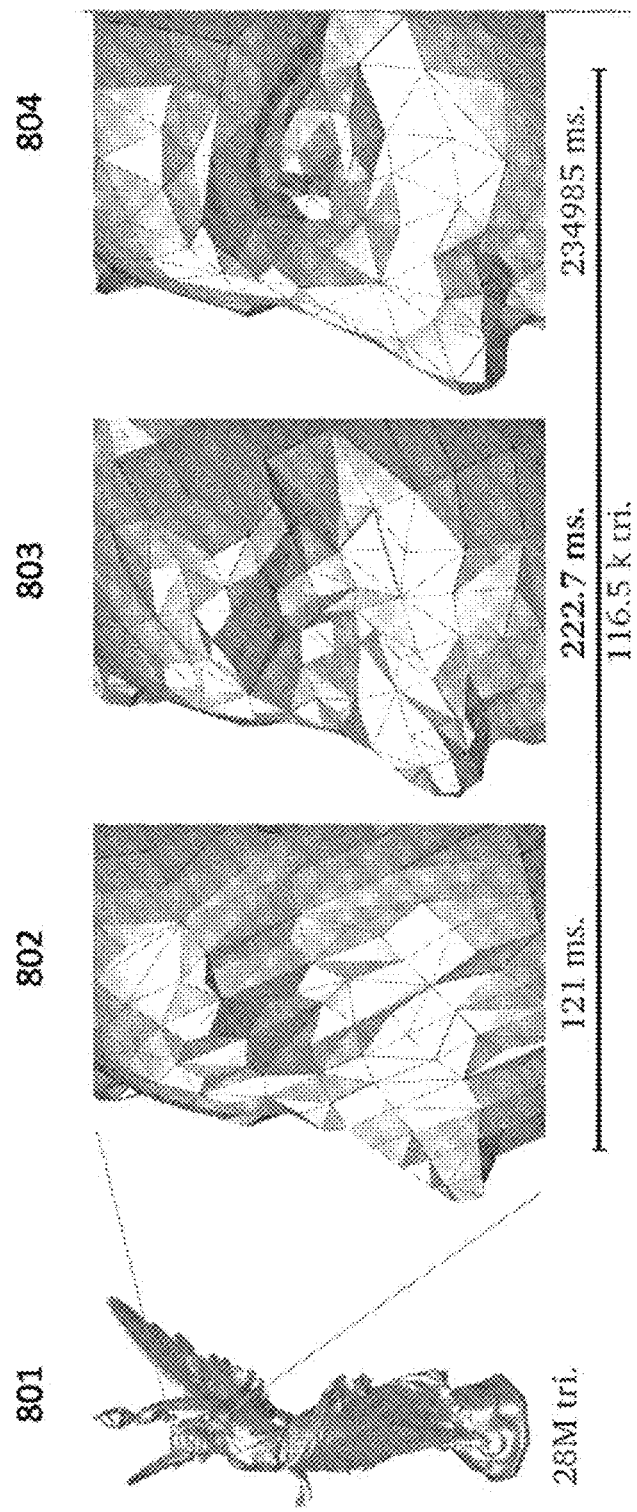
FIGS. 8a and 8b are examples of simplified models obtained by using different algorithms.
Figure 8B:
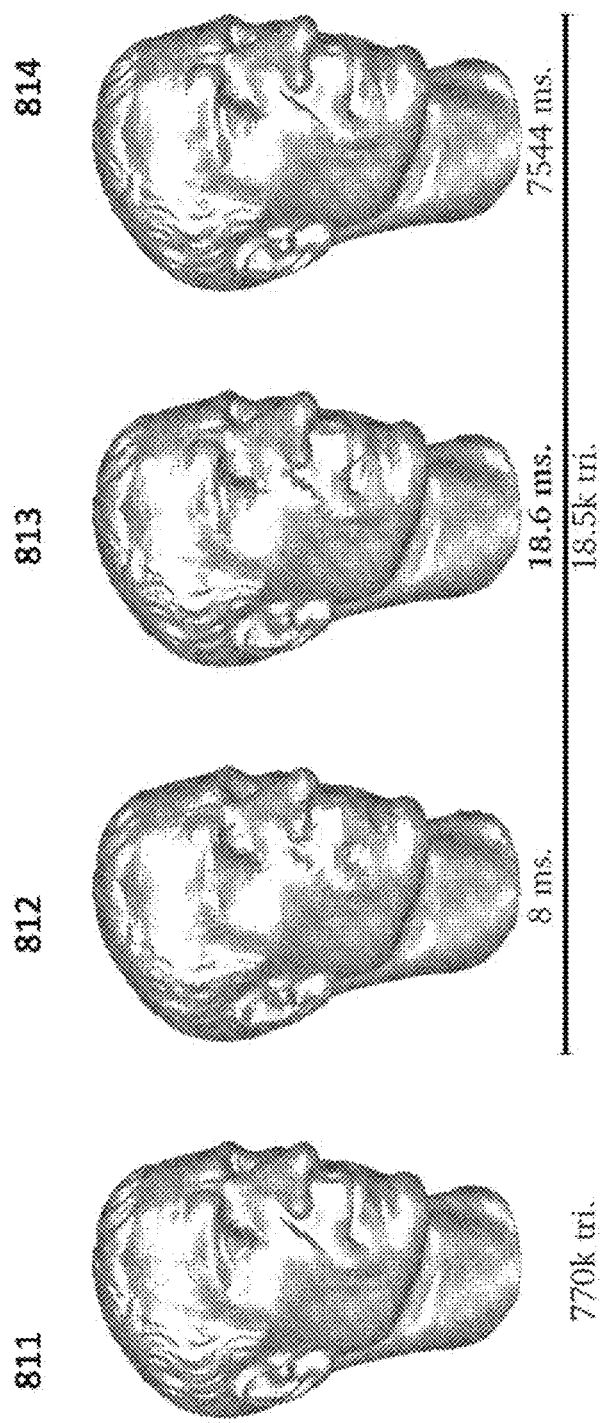

FIG. 8a and FIG. 8b are examples of simplified models obtained by using different algorithms.

For illustrative purposes, different algorithms were tested on a mesh model 801 containing 28 million faces, in order to obtain a simplified mesh model having about 116 thousand faces.

Mesh 802 is an example of simplification performed with an algorithm based on uniform partitioning (grid) according to the method proposed by Decoro and Tatarchuk (*Real-time mesh simplification using the gpu*, 2007), in 121 ms.

Mesh 803 is an example of simplification performed with the algorithm presented above, in 222 ms.

Mesh 804 is an example of simplification performed with an algorithm based on the method proposed by Michael Garland et al. (1997, *Surface Simplification Using Quadric Error Metrics*), in 234,985 ms.

One will note that the quality of the simplification proposed by Garland is better, but it is unsuitable for real-time constraints (simplification over 1000 times slower than the simplification proposed above).

Although the simplification proposed by Decoro and Tatarchuk is faster, the quality of the simplification is also lower.

Various algorithms were also tested on a mesh model 811 containing 770 thousand faces, in order to obtain a simplified mesh model having about 18 thousand faces.

Mesh 812 is an example of simplification performed with an algorithm based on uniform partitioning (grid) according to the method proposed by Decoro and Tatarchuk, in 8 ms.

Mesh 813 is an example of simplification performed with the algorithm presented above, in 18 ms.

Mesh 814 is an example of simplification performed with an algorithm based on the method proposed by Michael Garland et al. (1997, *Surface Simplification Using Quadric Error Metrics*), in 7544 ms.

Figure 9:
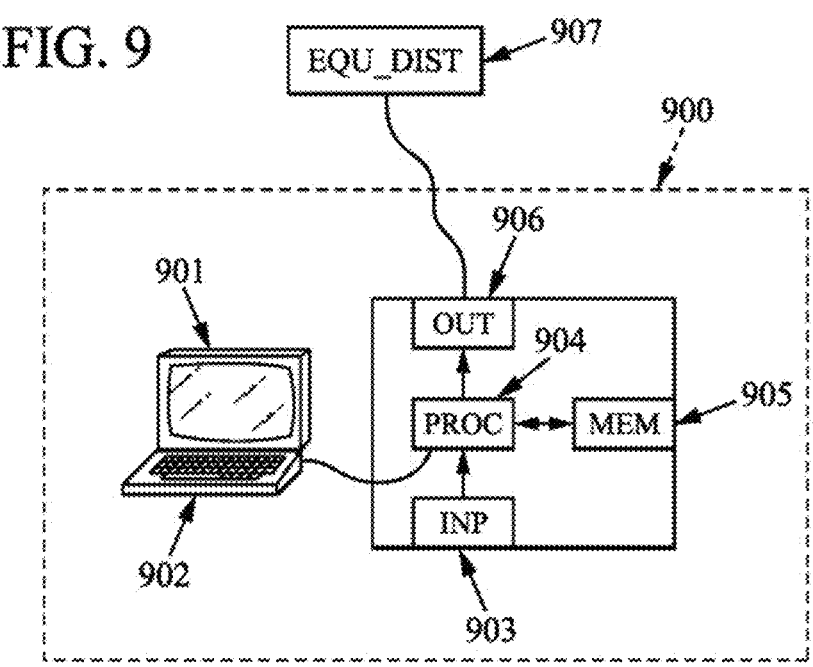
FIG. 9 shows an example mesh simplification device in one embodiment of the invention.

FIG. 9 shows an example mesh simplification device according to one embodiment of the invention.

In this embodiment, the device includes a computer 900 comprising a memory 905 for storing instructions enabling the implementation of the method, the rating data received, and temporary data for carrying out the various steps of the method as described above.

The computer further comprises a circuit 904. This circuit may be, for example:
- one or more processors capable of interpreting instructions in the form of a computer program, or
- a circuit board in which the steps of the inventive method are described in the silicon, or
- a programmable electronic chip such as a FPGA (Field-Programmable Gate Array).

This computer includes an input interface 903 for receiving the mesh points, and an output interface 906 for providing the simplified mesh to a remote computer for example 907. Finally, the computer may include, for easy interaction with a user, a screen 901 and a keyboard 902. Of course, the keyboard is optional, particularly in the context of a computer in the form of a touchscreen tablet for example.

Furthermore, the diagram presented in FIG. 6 is a typical example of a program in which some instructions can be carried out with the described device. As such, FIG. 6 can correspond to the flowchart of the general algorithm of a computer program within the meaning of the invention.

Of course, the present invention is not limited to the embodiments described above by way of example; it extends to other variants.

Other embodiments are possible.

For example, it is possible, for calculating the error $\in'$ based on the quadric associated with the node, to also take into account:
- a color associated with the node, and/or
- the value of a normal associated with the node.

To do this, in the process described in FIG. 6b (step 607), it is possible to determine, for each leaf node i, the average color $Col_i$ of the colors of faces adjacent to the point associated with this leaf node, the average color being determined by weighting the colors of the faces by the surface area of these faces.

It is also possible to calculate integral average colors $Col_i^S$ in the same manner as the integral quadrics are calculated in relation to FIG. 5.

The sum of the surface areas of faces adjacent to the point associated with this leaf node is denoted $A_i$. It is also possible to calculate integral surface areas $A_i^S$ in the same manner as the integral quadrics are calculated in relation to FIG. 5.

The values of $Col_i^S$ and $A_i^S$, are associated with leaf node i.

Furthermore, for each internal node j of the k-d tree, it is possible to determine a color value $Col_j$ as being:

$$Col_j = \frac{Col_{las}^S - Col_{ini-1}^S}{A_{las}^S - A_{ini-1}^S}$$

When calculating the error $\in'$ in step 613 of FIG. 6c, this error may also be a function of $\delta C_j = Col_j - C_j$ with $C_j$ being the average color of the colors of faces adjacent to the point associated with this node in the simplified mesh weighted by the sum of the surface areas of these adjacent faces. It is also possible to calculate $\delta C_j$ as being $$\delta C_j = \sqrt{\frac{Col_{las}^{S2} - Col_{ini-1}^{S2}}{A_{las}^S - A_{ini-1}^S} - C_j^2}.$$

The value of $\in'$ can be a weighted sum of the geometric error (presented above) and of the value of $\delta C_j$. Consideration of $\delta C_j$ enables better consideration of color and thus avoids the deletion of faces in areas having a strong color variation.

For consideration of a normal (vector indicating the orientation of the plane tangent to the surface at the point, which may result from a process of capturing/calculating/modeling that is different from the one which led to the position of the point, and giving more precise information on the geometry), it is also possible to associate with each leaf node a second quadric representative of a normal at the point associated with this leaf node. Then various calculations are performed in the process proposed in FIG. 6, in a manner similar to the quadric previously mentioned and representing the surfaces. The value of $\in'$ can be a weighted sum of the geometric error (presented above) and/or of the value of $\delta C_j$ and/or of error on the normal (calculated with the second quadric representative of the normal). Consideration of the normals better preserves details of the model and thus avoids deleting faces in areas having pronounced details (for example hair) but low geometric amplitudes.

A k-d tree is only one simple representation of the points of a mesh (simplified access based on associated Morton codes, optimized traversal, ease of computer implementation, etc.). It is quite possible not to use this type of tree to implement the invention: a more global approach is possible as described above.

The invention claimed is:

1. A method of simplifying a geometry model produced by a 3D modeling tool, the method comprising:
/a/ reception by a computer, comprising a memory, of said geometry model comprising a plurality of points ($p_i$), each point of the plurality of points being associated with an error rating ($Q_i$);
/b/ for each current point ($p_i$) of said geometry model,
determination of a Morton code associated with the current point ($p_i$), as a function of coordinates of said current point;
determination of an integral error rating ($Q_i^S$) defined as being a function of a sum of error ratings associated with points of the plurality of points having a lower associated Morton code than the Morton code associated with the current point;
/c/ determination of whether a given set of points of the plurality of points can be simplified by a new point, the points of the given set of points all being points of the plurality of points having an associated Morton code with a same prefix of given length, as a function of at least a difference between:
an integral error rating ($Q_{las}^S$) determined for a point of the given set of points having the greatest Morton code (las); and
an integral error rating ($Q_{ini-1}^S$) determined for a point of the plurality of points having an immediately lower Morton code (ini−1) than the smallest Morton code among the Morton codes associated with the points of the given set of points;
the ratings determined in steps b/ and c/ being stored in the memory of the computer,
/d/ providing via the computer a simplified geometry model based on the previous steps.

2. The method according to claim 1, wherein the error rating ($Q_i$) associated with a current point ($p_i$) of the plurality of points is a function of a quadric representative of faces of the simplified geometry model for which at least one of vertices of said faces is said current point or is at a distance less than a predetermined distance from said current point.

3. The method according to claim 1, wherein the error rating ($Q_i$) associated with a current point ($p_i$) of the plurality of points is a function of color of faces of the simplified geometry model for which at least one of vertices of said faces is said current point.

4. The method according to claim 1, wherein the error rating ($Q_1$) associated with a current point ($p_1$) of the plurality of points is a function of a quadric representative of a normal vector associated with said current point.

5. The method according to claim 1, wherein the method further comprises:
if a first point of the plurality of points is associated with a Morton code identical to a second point of the plurality of points, deletion of said second point from the plurality of points.

6. The method according to claim 1, wherein said new point is a function ($\hat{p}$) of the points of the given set of points.

7. The method according to claim 1, wherein said new point is determined ($\hat{p}$) by a minimization of a value that is a function of said difference.

8. The method according to claim 1, wherein the method further comprises:
determination of a k-d tree on the basis of a Morton coding, said k-d tree having said plurality of points as leaves.

9. The method according to claim 8, wherein, as said k-d tree has internal nodes, each internal node is associated with a point (p),
and wherein the determination in step /c/ is also a function of said point and of a transpose of said point.

10. The method according to claim 1, wherein the integral error rating ($Q_i^S$) for each current point is calculated as a function of a sum of:
an integral error rating ($Q_{i-1}^S$) of a point having an immediately lower Morton code than the Morton code of the current point;
an integral error rating of said current point ($Q_i$).

11. A device for simplification of a geometry model produced by a 3D modeling tool, the device comprising a computer, comprising a memory, and:

/a/ an interface for receiving said geometry model via the computer comprising a plurality of points, each point of the plurality of points being associated with an error rating;

/b/ a circuit suitable for, for each current point of said geometry model:
determination of a Morton code associated with the current point, as a function of coordinates of said current point;
determination of an integral error rating defined as being a function of a sum of error ratings associated with points of the plurality of points having a lower associated Morton code than the Morton code associated with the current point;

/c/ a circuit suitable for determination of whether a given set of points of the plurality of points can be simplified by a new point, the points of the given set of points all being points of the plurality of points having an associated Morton code with a same prefix of given length, as a function of at least a difference between:
an integral error rating determined for a point of the given set of points having the greatest Morton code; and
an integral error rating determined for a point of the plurality of points having an immediately lower Morton code than the smallest Morton code among the Morton codes associated with the points of the given set of points;

the ratings determined in steps b/ and c/ being stored in the memory of the computer, /d/ providing via the computer a simplified geometry model based on the previous steps.

12. A non-transitory computer readable medium comprising computer program instructions for implementing the method according to claim 1, the instructions read by a computer comprising at least one processor.

* * * * *